June 17, 1930.  E. H. ALLEN  1,764,380
CLAMP
Filed June 10, 1929
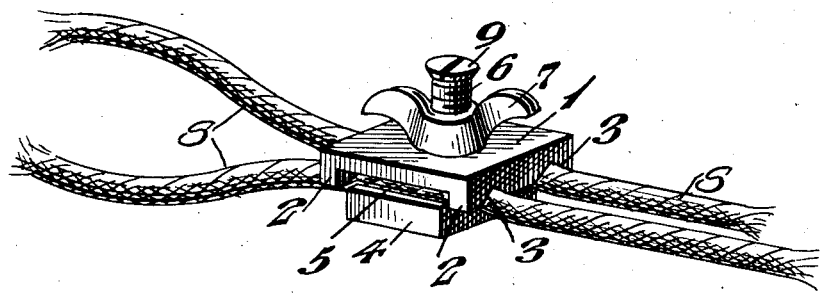
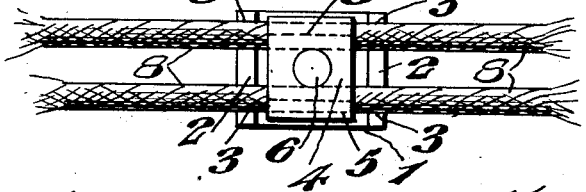
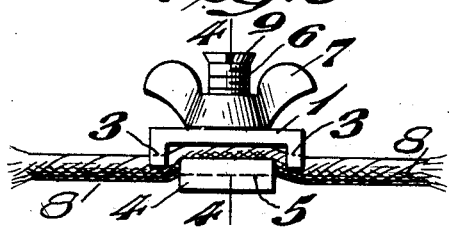
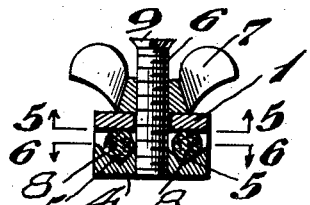
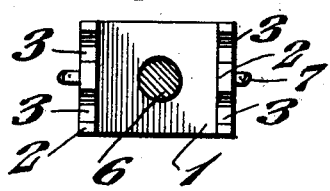
INVENTOR:
Edward H. Allen,
BY
William J Jackson
ATTORNEY.

Patented June 17, 1930

1,764,380

UNITED STATES PATENT OFFICE

EDWARD H. ALLEN, OF PALMYRA, NEW JERSEY

CLAMP

Application filed June 10, 1929. Serial No. 369,782.

This invention, generally stated, relates to a clamp and has more especial relation to a rope, cord, cable, or similar clamp adapted among other things for use in connection with clothes lines, tow lines for motor cars, and similar connections.

One object of the present invention is to provide a clamp which may be used in connection with a rope, cable, or the like, whereby the same may be easily slackened or tightened, and in which the rope, cable or the like may be attached with respect to the clamp without the employment of knots.

A further object of the present invention is to provide a clamp of the character stated whereby the rope, cable, or the like may be readily and conveniently inserted with respect to the clamp in a sidewise manner, thereby eliminating the necessity of threading the rope or cable with respect to the clamp.

A further object of the present invention is to provide a clamp of the character stated the parts of which are so arranged with respect to one another that the post plates at all times are interlocked with respect to one another so that danger of one plate becoming separated from the other plate is obviated.

A still further object of the present invention is to provide a clamp of the character stated in which a pair of plates are employed one of which is substantially U-shaped in cross section, and the other of which is of rectangular cross section and is arranged to nest with the plate of U-shaped cross section.

Other and further objects of the present invention reside in the provision of general details of construction and in the arrangement, combination, and connection of parts for attaining the results sought by the foregoing objects.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view in perspective of a clamp embodying the invention.

Fig. 2, is a bottom plan view of Fig. 1.

Fig. 3, is an elevational view of Fig. 1.

Fig. 4, is a view in section taken upon the line 4—4 of Fig. 3.

Fig. 5, is a view in section viewed substantially upon the line 5—5 of Fig. 4.

Fig. 6, is a view in section viewed substantially upon the line 6—6 of Fig. 4.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the reference numeral 1 designates a plate of rectangular configuration having opposed flanges 2 so that viewed in cross section the plate 1 is substantially U-shaped. The flanges 2 are each provided with V-shaped notches 3. Disposed opposite the plate 1 is a second plate designated 4 which is also of rectangular configuration but of such size that it is accommodated between the flanges 2 of plate 1, as is clearly illustrated in Figs. 1, 2, and 3. In cross section the plate 4 is provided throughout its length with a pair of V-shaped, parallel grooves 5, best seen in Figs. 4 and 6. With the plates 1 and 4 in clamped position the V-shaped notches 3 are in register with the V-shaped grooves 5. The plates 1 and 4 are so assembled that they constitute in effect a unitary structure so that the parts of the clamp as a whole are not liable to become detached one from another. Having screw threaded relation with plate 4 is a bolt 6. The plate 1 is apertured so as to be free to move with respect to the bolt 6. In other words, the plate 1 does not have screw threaded relation with the bolt 6. Having screw threaded relation with the bolt 6 is a butterfly nut 7 whereby the plate 1 may be caused to advance towards the plate 4 so that a rope 8, cable or the like, may be clamped between the plates 1 and 4. In the connection it is to be noted that the registering notches and grooves of the respective plates permit of the accepting of ropes, cables, or the like, of varying diameter so that a tight grip may be obtained irrespective of the diameter of the rope or cable. This is possible because the smaller plate 4 engages between the flanges 2 of plate 1. It is also to be noted that the rope, cable or the like may be introduced sidewise between the plates 1 and 4 in contradistinction to threading the rope, cable, or the like endwise between the two plates. Another point is that the rope, cable, or the like may be clamped to place without the necessity of employing knots. The bolt 6 is provided with a head 9 slotted for the acceptance of a screw driver so that the bolt may be caused to engage plate 4. In the connection it is to be noted that the head 9 prevents the escape of the butterfly nut 7 so that the various parts of the clamp cannot become accidentally detached.

The above described clamp is particularly adapted for use in connection with clothes lines where a rope may be formed to go around a clothes pole and the ends of the line diverged for attachment to other poles.

However, the device is applicable for use in connection with tow lines for motor cars, and other uses where a quick clamping of a rope, cable or the like may be effected without the employment of knots.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

What I claim is:

1. A clamp of the character stated comprising a main member of generally rectangular configuration and of substantially inverted, U-shaped cross section the pendant or flanged portions of which are angular and are arranged at right angles to the top of said member and have opposed pairs of V-shaped notches, a second rectangular member of a dimension less than the dimension of the main member, said second member having notched portions arranged for alignment with the notches of said main member, a bolt having screw-threaded relation with said second member and having free passage through said main member, and a nut for advancing said main member toward said second member.

2. A clamp of the character stated comprising a main member of generally rectangular configuration and of substantially inverted, U-shaped cross section the pendant or flanged portions of which are angular and are arranged at right angles to the top of said member and have opposed pairs of V-shaped notches, a second rectangular member of a dimension less than the dimension of the main member, said second member having notched portions arranged for alignment with the notches of said main member, a bolt having screw-threaded relation with said second member and having free passage through said main member, a nut for advancing said main member toward said second member, and means upon said bolt for preventing accidental separation of said members.

3. A clamp of the character stated comprising a main member of generally rectangular configuration and of substantially inverted, U-shaped cross section the pendant or flanged portions of which are angular and are arranged at right angles to the top of said member and have opposed pairs of V-shaped notches, a second rectangular member of a dimension less than the dimension of the main member, said second member having notched portions arranged for alignment with the notches of said main member, a bolt having screw-threaded relation with said second member and having free passage through said main member, whereby a rope, cable, cord, or the like may be inserted sidewise between said members without endwise feeding or the employment of knots, and a nut for advancing said main member toward said second member.

EDWARD H. ALLEN.